(12) United States Patent
Mahendra et al.

(10) Patent No.: US 11,166,067 B1
(45) Date of Patent: Nov. 2, 2021

(54) SYSTEM AND METHOD FOR VIEW OPTIMIZED 360 DEGREE VIRTUAL REALITY VIDEO STREAMING

(71) Applicant: TENCENT AMERICA LLC, Palo Alto, CA (US)

(72) Inventors: Shalin Mahendra, Palo Alto, CA (US); Fai Yeung, Palo Alto, CA (US); Shan Liu, San Jose, CA (US); Meng Xu, Palo Alto, CA (US); Weiwei Feng, Mountain View, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/097,604

(22) Filed: Nov. 13, 2020

(51) Int. Cl.
*H04N 21/44* (2011.01)
*H04N 21/433* (2011.01)
*H04N 21/81* (2011.01)
*H04N 21/218* (2011.01)
*H04N 21/845* (2011.01)
*H04N 21/426* (2011.01)
*H04N 21/442* (2011.01)

(52) U.S. Cl.
CPC . *H04N 21/44004* (2013.01); *H04N 21/21805* (2013.01); *H04N 21/42607* (2013.01); *H04N 21/433* (2013.01); *H04N 21/44209* (2013.01); *H04N 21/816* (2013.01); *H04N 21/8456* (2013.01)

(58) Field of Classification Search
CPC ....... H04N 21/44004; H04N 21/21805; H04N 21/42607; H04N 21/433; H04N 21/44209; H04N 21/816; H04N 21/8456
See application file for complete search history.

(56) References Cited

U.S. PATENT DOCUMENTS

2013/0336638 A1* 12/2013 Fork ................. H04N 21/4331
386/278
2017/0244991 A1* 8/2017 Aggarwal ............ G11B 27/036

OTHER PUBLICATIONS

International Search Report dated Jun. 21, 2021, issued by the International Searching Authority in application No. PCT/US2021/033368.
Written Opinion dated Jun. 21, 2021, issued by the International Searching Authority in application No. PCT/US2021/033368.

* cited by examiner

*Primary Examiner* — Sunghyoun Park
(74) *Attorney, Agent, or Firm* — Sughrue Mion, PLLC

(57) ABSTRACT

An approach for streaming a coded virtual reality (VR) video stream including receiving a segments of the coded VR video stream; storing the segments in a playback buffer; based on determining that a current playback time is within a threshold time of a playback time of a buffered segment, that a current duration of the playback buffer is larger than a threshold duration, and that a current bandwidth is larger than a threshold bandwidth, and that a current viewport is different from a previous viewport, storing at least one refined tile corresponding to the current viewport in the playback buffer; constructing a frame based on the buffered segment and the at least one refined tile corresponding to the current viewport; and decoding the coded VR video stream based on the constructed frame.

20 Claims, 11 Drawing Sheets

SYSTEM AND METHOD FOR VIEW OPTIMIZED 360 DEGREE VIRTUAL REALITY VIDEO STREAMING

FIELD

This disclosure relates generally to the field of data processing, and more particularly to video encoding and/or decoding involving view-optimized 360 degree virtual reality (VR) video streaming.

BACKGROUND 360 degree VR video streaming presents several unique challenges over a regular video streaming pipeline. For example, the resolution of the 360 video is generally very large, ranging anywhere from 4K to all the way up to 16K. The resolution becomes twice as large if the video to be delivered is in stereo format. Such high resolution videos also requires very high bandwidth network for real-time streaming.

SUMMARY

Embodiments relate to a method, system, and computer readable medium for streaming a coded virtual reality (VR) video stream.

According to one aspect, a method for streaming a coded VR video stream is provided. The method may include receiving a plurality of segments of the coded VR video stream; storing the plurality of segments in a playback buffer, wherein a buffered segment from among the plurality of segments includes a plurality of buffered tiles including at least one refined buffered tile corresponding to a previous viewport; determining whether a current playback time of a VR video corresponding to the coded VR video stream is within a threshold time of a playback time of the buffered segment; determining whether a current duration of the playback buffer is larger than a threshold duration; determining whether a current bandwidth is larger than a threshold bandwidth; determining whether a current viewport is different from the previous viewport; based on determining that the current playback time is within the threshold time, that the current duration of the playback buffer is larger than the threshold duration, and that the current bandwidth is larger than the threshold bandwidth, and that the current viewport is different from the previous viewport, storing at least one refined tile corresponding to the current viewport in the playback buffer; constructing a frame corresponding to the buffered segment based on the plurality of buffered tiles and the at least one refined tile corresponding to the current viewport; and decoding the coded VR video stream based on the constructed frame.

According to one aspect, a device for streaming a coded VR video stream is provided. The device may include at least one memory configured to store program code; and at least one processor configured to read the program code and operate as instructed by the program code, the program code including: receiving code configured to cause the at least one processor to receive a plurality of segments of the coded VR video stream; first storing code configured to cause the at least one processor to store the plurality of segments in a playback buffer, wherein a buffered segment from among the plurality of segments includes a plurality of buffered tiles including at least one refined buffered tile corresponding to a previous viewport; first determining code configured to cause the at least one processor to determine whether a current playback time of a VR video corresponding to the coded VR video stream is within a threshold time of a playback time of the buffered segment; second determining code configured to cause the at least one processor to determine whether a current duration of the playback buffer is larger than a threshold duration; third determining code configured to cause the at least one processor to determine whether a current bandwidth is larger than a threshold bandwidth; fourth determining code configured to cause the at least one processor to determine whether a current viewport is different from the previous viewport; second storing code configured to cause the at least one processor to, based on determining that the current playback time is within the threshold time, that the current duration of the playback buffer is larger than the threshold duration, and that the current bandwidth is larger than the threshold bandwidth, and that the current viewport is different from the previous viewport, store at least one refined tile corresponding to the current viewport in the playback buffer; first constructing code configured to cause the at least one processor to construct a fame corresponding to the buffered segment based on the plurality of buffered tiles and the at least one refined tile corresponding to the current viewport; and decoding code configured to cause the at least one processor to decode the coded VR video stream based on the constructed frame.

According to one aspect, a non-transitory computer-readable medium for streaming a coded VR video stream is provided. The non-transitory computer-readable medium may store instructions including one or more instructions that, when executed by one or more processors of a device for video decoding, cause the one or more processors to: receive a plurality of segments of the coded VR video stream; store the plurality of segments in a playback buffer, wherein a buffered segment from among the plurality of segments includes a plurality of buffered tiles including at least one refined buffered tile corresponding to a previous viewport; determine whether a current playback time of a VR video corresponding to the coded VR video stream is within a threshold time of a playback time of the buffered segment; determine whether a current duration of the playback buffer is larger than a threshold duration; determine whether a current bandwidth is larger than a threshold bandwidth; determine whether a current viewport is different from the previous viewport; based on determining that the current playback time is within the threshold time, that the current duration of the playback buffer is larger than the threshold duration, and that the current bandwidth is larger than the threshold bandwidth, and that the current viewport is different from the previous viewport, store at least one refined tile corresponding to the current viewport in the playback buffer; construct a frame corresponding to the buffered segment based on the plurality of buffered tiles and the at least one refined tile corresponding to the current viewport; and decode the coded VR video stream based on the constructed frame.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

Embodiments relate generally to buffer management techniques while playing view-optimized virtual reality (VR) 360 degree video on a client device. For example, embodiments may relate to systems and methods which may decouple playback buffer size and viewport switching latency in view-optimized VR 360 degree video streaming.

Aspects are described herein with reference to flowchart illustrations and/or block diagrams of methods, apparatus (systems), and computer readable media according to the various embodiments. It will be understood that each block of the flowchart illustrations and/or block diagrams, and combinations of blocks in the flowchart illustrations and/or block diagrams, can be implemented by computer readable program instructions.

Figure 1:
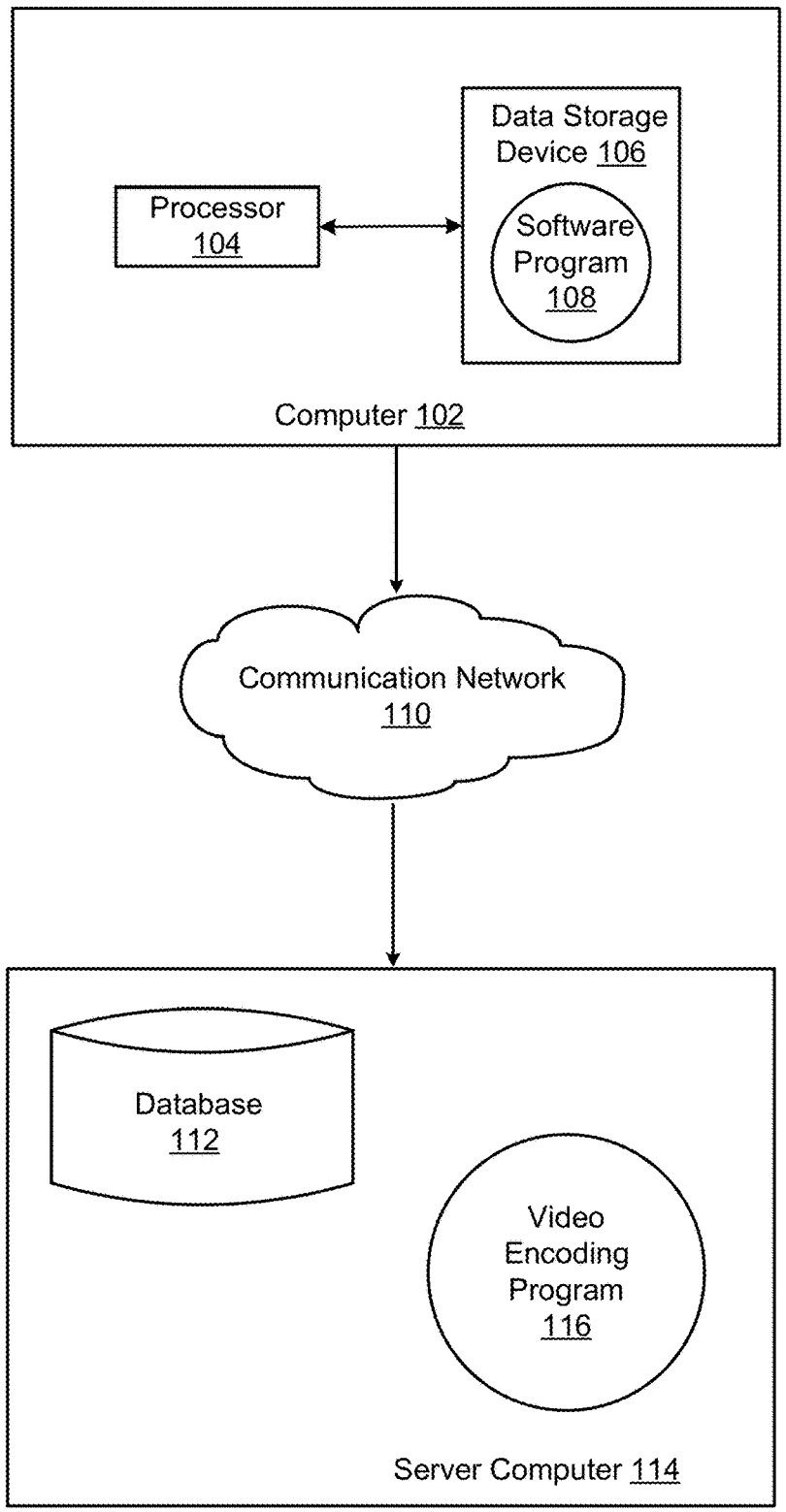
FIG. 1 illustrates a networked computer environment according to at least one embodiment.

Referring now to FIG. 1, a functional block diagram of a networked computer environment illustrating a video coding system 100 (hereinafter "system") for encoding and/or decoding video data according to exemplary embodiments such as those described herein. It should be appreciated that FIG. 1 provides only an illustration of one implementation and does not imply any limitations with regard to the environments in which different embodiments may be implemented. Many modifications to the depicted environments may be made based on design and implementation requirements.

The system 100 may include a computer 102 and a server computer 114. The computer 102 may communicate with the server computer 114 via a communication network 110 (hereinafter "network"). The computer 102 may include a processor 104 and a software program 108 that is stored on a data storage device 106 and is enabled to interface with a user and communicate with the server computer 114. As will be discussed below with reference to FIG. 9 the computer 102 may include internal components 800A and external components 900A, respectively, and the server computer 114 may include internal components 800B and external components 900B, respectively. The computer 102 may be, for example, a mobile device, a telephone, a personal digital assistant, a netbook, a laptop computer, a tablet computer, a desktop computer, or any type of computing devices capable of running a program, accessing a network, and accessing a database.

The server computer 114 may also operate in a cloud computing service model, such as Software as a Service (SaaS), Platform as a Service (PaaS), or Infrastructure as a Service (IaaS), as discussed below with respect to FIGS. 10 and 11. The server computer 114 may also be located in a cloud computing deployment model, such as a private cloud, community cloud, public cloud, or hybrid cloud.

The server computer 114, which may be used for encoding video data is enabled to run a Video Encoding Program 116 (hereinafter "program") that may interact with a database 112. In one embodiment, the computer 102 may operate as an input device including a user interface while the program 116 may run primarily on server computer 114. In an alternative embodiment, the program 116 may run primarily on one or more computers 102 while the server computer 114 may be used for processing and storage of data used by the program 116. It should be noted that the program 116 may be a standalone program or may be integrated into a larger video encoding program.

It should be noted, however, that processing for the program 116 may, in some instances be shared amongst the computers 102 and the server computers 114 in any ratio. In another embodiment, the program 116 may operate on more than one computer, server computer, or some combination of computers and server computers, for example, a plurality of computers 102 communicating across the network 110 with a single server computer 114. In another embodiment, for example, the program 116 may operate on a plurality of server computers 114 communicating across the network 110 with a plurality of client computers. Alternatively, the program may operate on a network server communicating across the network with a server and a plurality of client computers.

The network 110 may include wired connections, wireless connections, fiber optic connections, or some combination thereof. In general, the network 110 can be any combination of connections and protocols that will support communications between the computer 102 and the server computer 114. The network 110 may include various types of networks, such as, for example, a local area network (LAN), a wide area network (WAN) such as the Internet, a telecommunication network such as the Public Switched Telephone Network (PSTN), a wireless network, a public switched network, a satellite network, a cellular network (e.g., a fifth generation (5G) network, a long-term evolution (LTE) network, a third generation (3G) network, a code division multiple access (CDMA) network, etc.), a public land mobile network (PLMN), a metropolitan area network (MAN), a private network, an ad hoc network, an intranet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of system 100 may perform one or more functions described as being performed by another set of devices of system 100.

Figure 2:
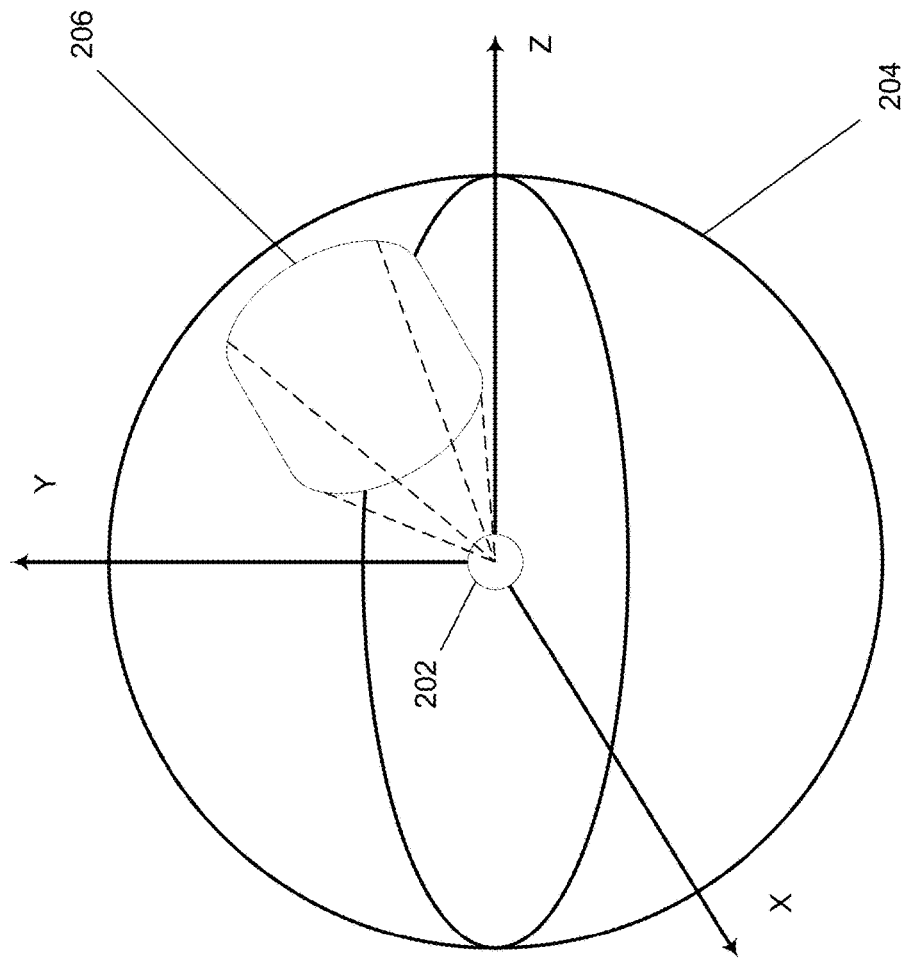
FIG. 2 illustrates an example of a viewport in a frame of a 360 virtual reality (VR) video, according to at least one embodiment.

Several techniques may be used to tackle the large bandwidth requirement of 360 degree VR videos. According to embodiments, as illustrated for example in FIG. 2, some techniques may exploit the fact that when 360 degree VR video is consumed on a client device, a user 202 is looking only at part of the entire 360 degree sphere 204. This portion of the sphere 204 under a field of view (FOV) of the user 202 may be referred to as a viewport 206. Because the user is not looking at the entire sphere 202 of 360 degree video at the same time, the areas not visible to the user may not be delivered in the highest quality. Embodiments relating to this VR 360 video streaming optimization technique may be referred to view-optimized or viewport-based streaming. Using this optimization technique, the areas under the user's viewport, for example viewport 206, may be delivered at the highest quality, while the remaining areas are delivered at relatively lower qualities.

According to embodiments, there may be several ways in which such viewport-based streaming can be implemented.

For example, in embodiments, multiple representations of the 360 scene may be created, each covering a unique area of the scene in high quality and rest of the scene in low quality.

Figure 3A:
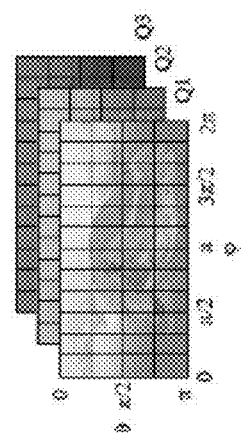
FIGS. 3A-3D illustrate examples of tile-based VR video streaming, according to at least one embodiment.
Figure 3B:
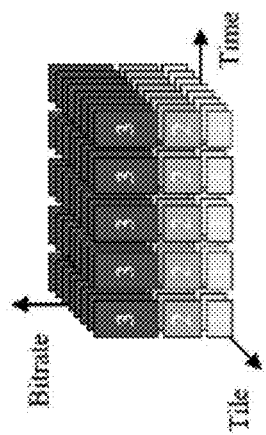
Figure 3C:
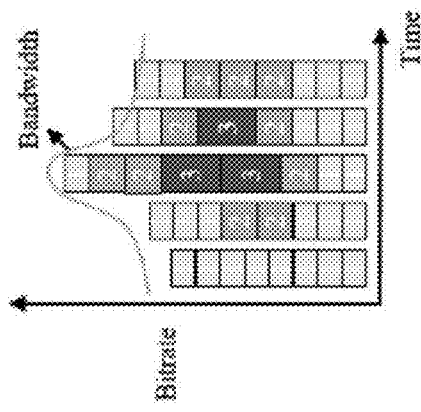
Figure 3D:
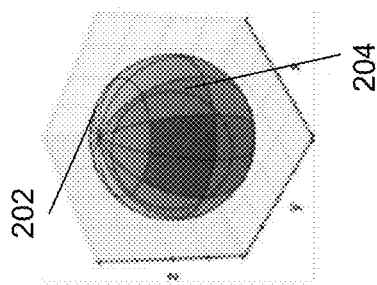

As another example, in embodiments tile-based streaming may be used. FIGS. 3A-3B illustrate examples of tile-based streaming, according to embodiments. For example, as shown in FIG. 3A, a 360 degree scene may be divided into several tiles, and multiple such representations may be created, for example representation Q1 which may have low quality or low resolution, representation Q2 which may have a higher quality or higher resolution, and representation Q3, which may have a highest quality and a highest resolution. A video client may dynamically merge the high quality tiles, for example the tiles designated 3 and 2 in FIGS. 3B and 3C, for the area of the sphere 204 corresponding to the viewport 206 and low quality tiles, for example the tiles designated 1 in FIGS. 3B and 3C, for non viewport areas of the sphere 204, to create an entire frame of a 360 degree VR video. As shown in FIG. 3C, using a larger number of high quality tiles may increase a required bandwidth.

While such techniques may be helpful in optimizing client side bandwidth requirements, several challenges may be presented when a client viewport changes within a 360 degree virtual reality environment. When the user moves around, the client may download new video frames with high quality tiles/streams in the user's new viewport. But the client continues to play video frames which were already buffered for the previous viewport.

Figure 4:
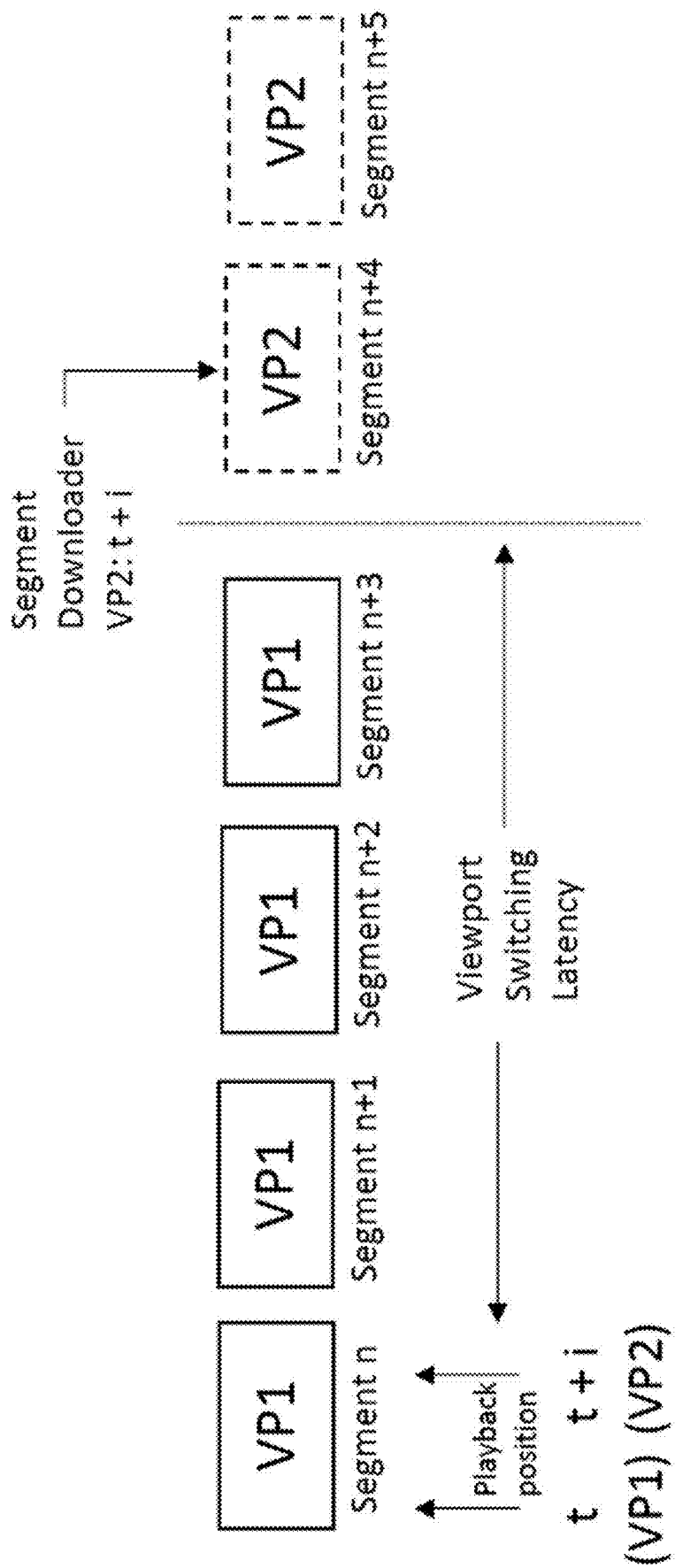
FIG. 4 illustrates an example of filling a playback buffer of a video client while a user's viewport changes, according to at least one embodiment.

FIG. 4 illustrates an example of filling a playback buffer of a video client while a user's viewport changes. For example, at time t, a current viewport may be viewport VP1. While the current viewport remains viewport VP1, the playback buffer may be filled with segments optimized for viewport VP1, for example segment n, segment n+1, segment n+2, and segment n+3.

Then, at time t+i, a current viewport may change to viewport VP2. Therefore, the client may start downloading new segments optimized for VP2, for example segment n+4 and segment n+5. However, the client may continue playing VP1 segments already available in the playback buffer, for example segment n, segment n+1, segment n+2, and segment n+3, which are optimized for viewport VP1. As a result, the user may have suboptimal experience until client starts playing newly downloaded video frames. This time difference between when the user starts looking at the new viewport VP2 to the time they actually start seeing highest possible quality tiles/stream in their new viewport may be referred to as viewport switching latency. For example, the viewport switching latency may be proportional to the sum of playback buffer duration and segment duration.

One technique to optimize this view switching may be to keep a very short buffer duration on the client side. While this may help in reducing viewport switching latency, it may introduce issues in terms of protecting player buffer against varying network conditions on the client side. If the client bandwidth drops, the playback may be halted until all the required tiles/streams are downloaded. On the other hand, even if client has great bandwidth, the player may not be able to prebuffer segments to protect the player buffer from starvation during low bandwidth periods.

Accordingly, viewport-based streaming may be a desirable way to deliver highest quality video to the client. However, improved Quality of Experience (QoE) may be delivered by minimize viewport switching delay, and optimizing the total available bandwidth for smooth playback Therefore, embodiments may relate to a novel approach which may decouple player side buffer length with the viewport switching latency. This may allow clients to keep larger buffers to protect the player against network jitters without compromising the viewport switching latency. This may also allow better use of client's overall bandwidth and deliver more optimized viewport for the user's FOV.

To achieve this, embodiments may include two novel modules in the 360 video playback pipeline, specifically a Segment Download and Refinement Module (SDRM), and a Tile Merger Module (TMM).

Figure 5:
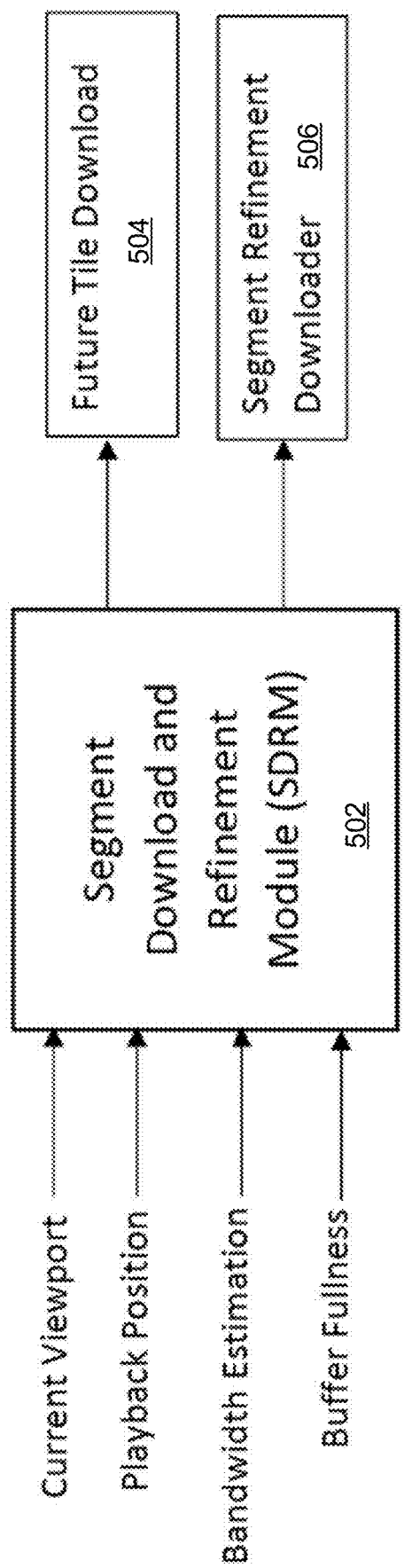
FIG. 5 illustrates an example of a segment download and refinement module, according to at least one embodiment.

FIG. 5 illustrates SDRM 502, which may be an example of an SDRM according to embodiments. In addition to downloading future segments in a linear order, for example using future tile downloader 504 in a manner similar to related art adaptive bitrate (ABR) techniques, SDRM 502 may have the ability to refine the quality of already downloaded segments by fetching specific segment tiles in a non-linear order, using for example segment refinement downloader 506. In embodiments, when a current playback time approaches a timestamp of a previously downloaded and buffered segment, SDRM 502 may check if the current viewport is same as what was used while initially downloading that segment. If it has changed, SDRM 502 may attempt to download several new tiles/streams more suitable to the new viewport based on the available bandwidth and current occupancy of playback buffer. An example of this is discussed in greater detail below with respect to FIG. 9. In embodiments SDRM 502 may have knowledge of the current playback timeline and also may have the ability to download individual tiles of segments in non-increasing order.

Figure 6:
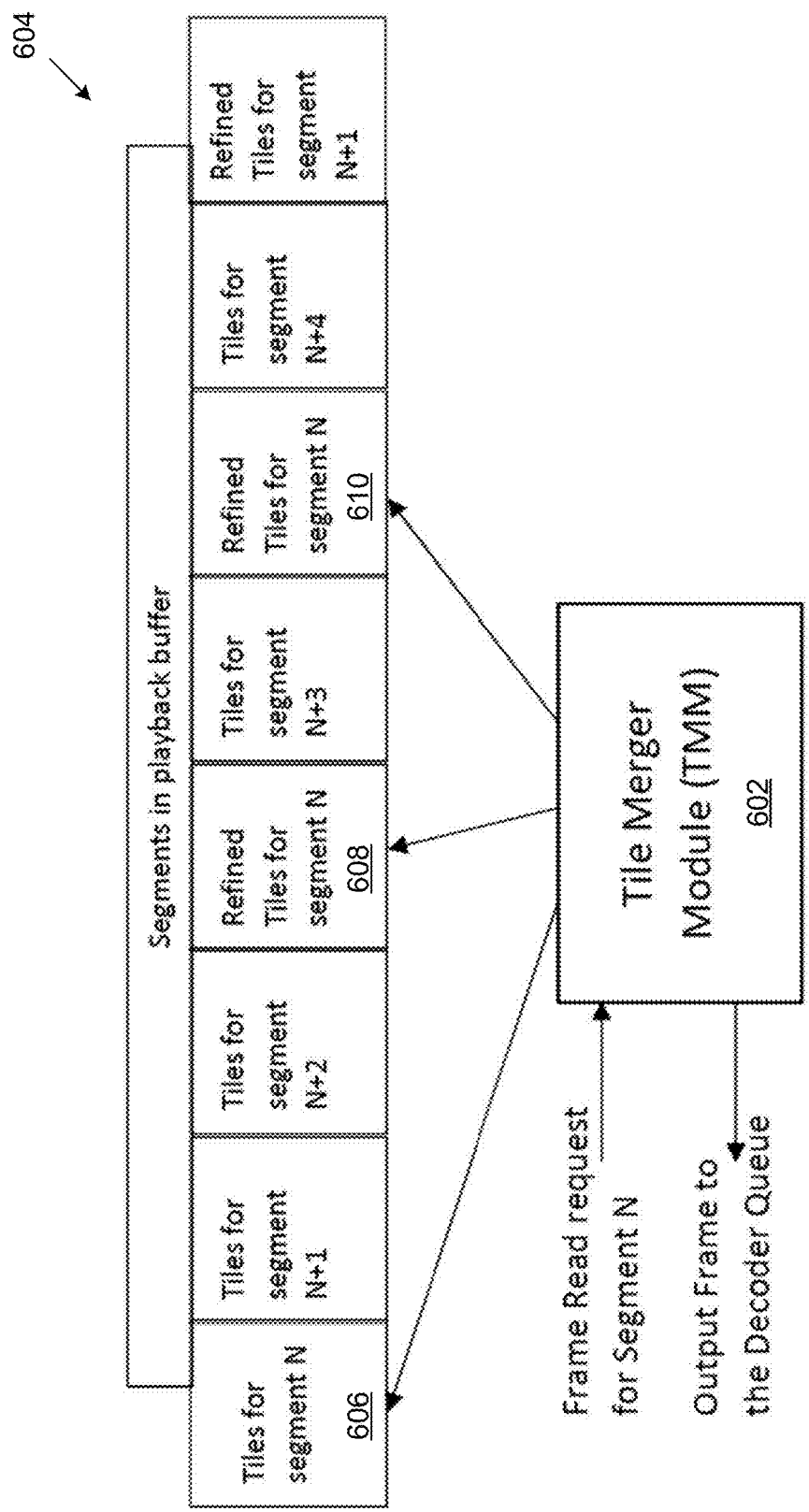
FIG. 6 illustrates an example of tile merger module, according to at least one embodiment.

In embodiments, SDRM 502 may facilitate prebuffering of the video segments under good bandwidth conditions. In case of bandwidth fluctuations on the client side, the player will still be able to keep the playback going. Another important advantage of this module is that, it keeps track of the current playback timeline and refines the viewport quality of the previously downloaded segments to closely match with what the viewer is looking at. This allows it to fetch more optimized tiles for the user's viewport without re-downloading all FIG. 6 illustrates TMM 602, which may be an example of a TMM according to embodiments. Unlike a related art playback pipeline, where video frames are read from the playback buffer in a first in first out (FIFO) order, in embodiments TMM 602 may read downloaded segments from the playback buffer 604 in a non-FIFO order. In embodiments, TMM 602 may be used to make a decision on which tiles/streams are going to be a part of the next video segment to be decoded at the last possible time, for example while reading a first instantaneous decoder refresh (IDR) frame for that segment. This means that TMM 602 also may have access to user's current viewport to decide on which tiles to be merged to build a frame. Because the tiles/streams for a given segment may be scattered across playback buffer 604, for example as illustrated in FIG. 6, they may be brought together by TMM 602 to create a single decodable frame which may be fed to the decoder queue. Accordingly, TMM 602 may have an ability to read the buffered data in a non FIFO way.

In embodiments, letting TMM 602 make the decision on which tiles will form the final frame may help in creating the highest quality viewport for the viewer. Because TMM 602 is invoked just before the frame is displayed to the viewer, TMM 602 may use the most current and accurate FOV information to deliver the highest quality viewport. As an example, when constructing a frame corresponding to segment N, TMM 602 may merge a set 606 of tiles for segment N, and two sets 608 and 610 of refined tiles for segment N, all of which are downloaded and buffered at different times and stored at different locations in playback buffer 604, as illustrated in FIG. 6

Figure 7:
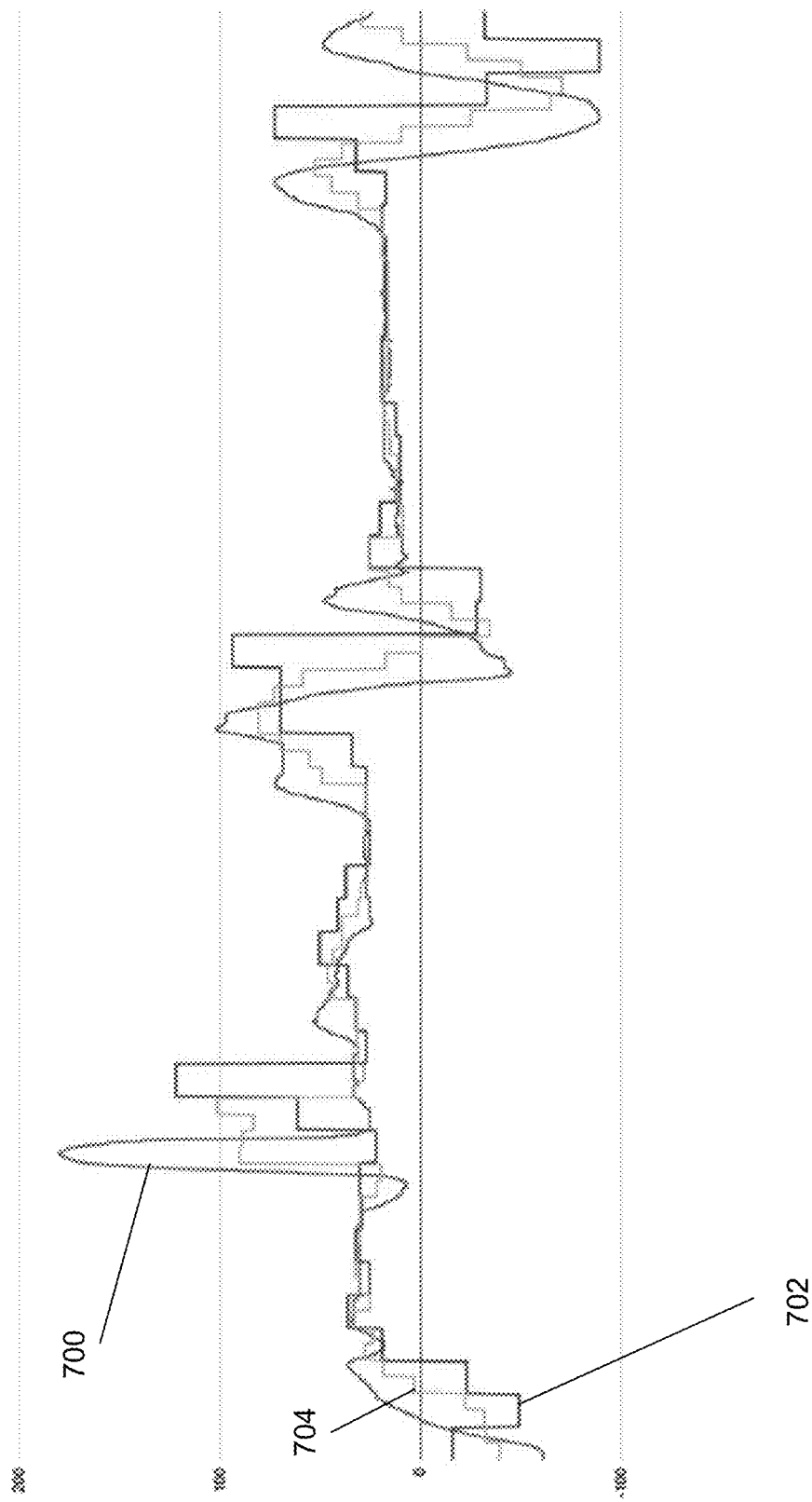
FIG. 7 illustrates an example comparison between a user position and viewport positions, according to at least one embodiment.

FIG. 7 illustrates an example comparison between a position 702 of a non-optimized viewport, a position 704 of a viewport optimized according to embodiments, and a user position 700. As can be seen in FIG. 7, when a user moves in the 360 environment, embodiments may quickly deliver high quality tiles in the user's viewport.

Figure 8:
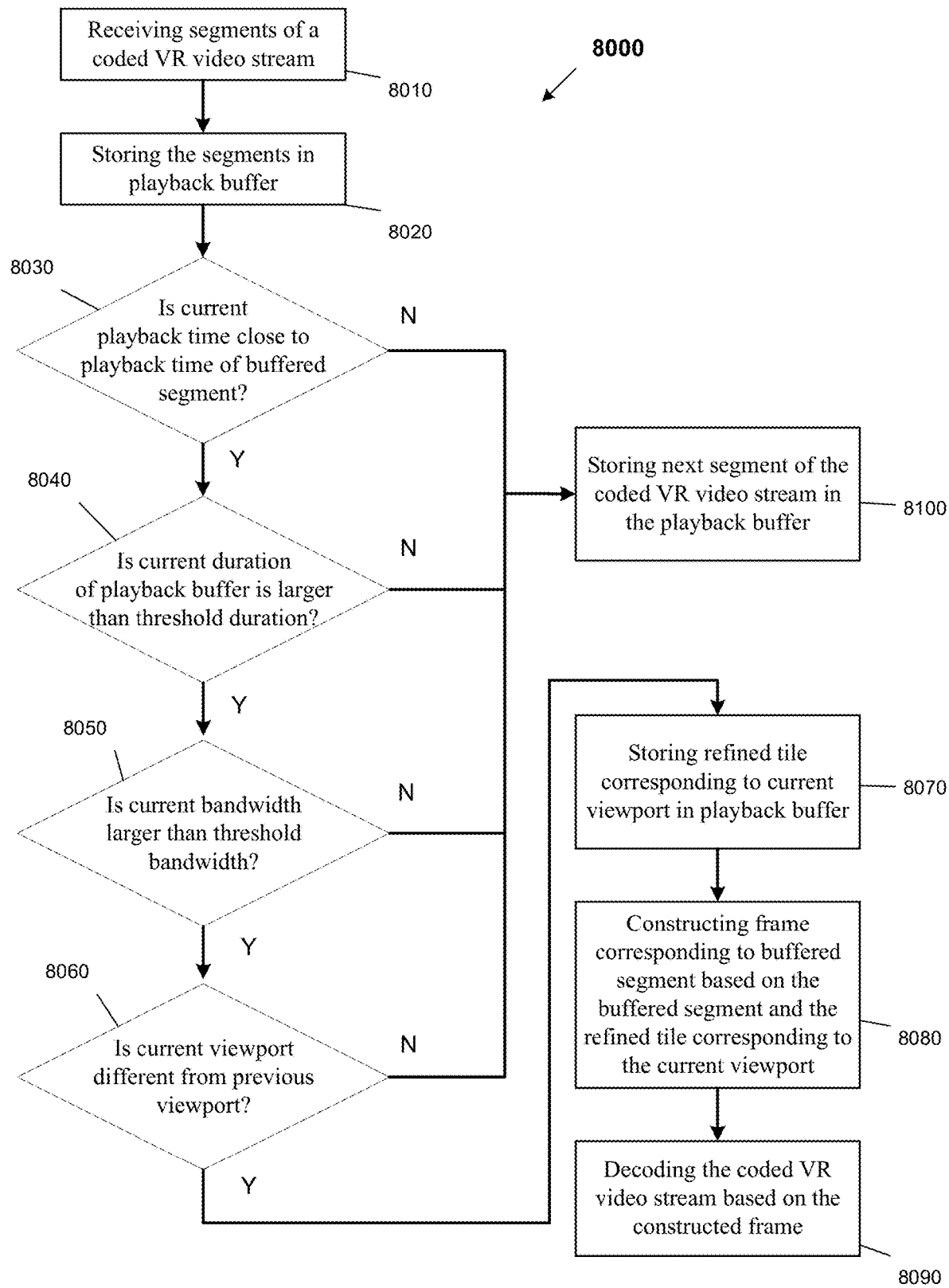
FIG. 8 is an operational flowchart illustrating the steps carried out by a program that codes video data, according to at least one embodiment.

Referring now to FIG. 8, an operational flowchart illustrating the steps of a method 8000 for streaming, for example receiving, a coded virtual reality (VR) video stream is depicted. In some implementations, one or more process blocks of FIG. 8 may be performed by the computer 102 (FIG. 1) and the server computer 114 (FIG. 1). In some implementations, one or more process blocks of FIG. 8 may be performed by another device or a group of devices separate from or including the computer 102, the server computer 114, the SDRM 502, and the TMM 602.

At 8010, the method 8000 includes receiving a plurality of segments of the coded VR video stream.

At 8020, the method 8000 includes storing the plurality of segments in a playback buffer. In embodiments, a buffered segment from among the plurality of segments may include a plurality of buffered tiles including at least one refined buffered tile corresponding to a previous viewport. In embodiments, the previous viewport may correspond to, for example, VP1 discussed above, the playback buffer may correspond to playback buffer 604 discussed above, and the buffered segment may correspond to, for example, segment N discussed above.

At 8030, the method 8000 includes determining whether a current playback time of a VR video corresponding to the coded VR video stream is close to the playback time of the buffered segment. In embodiments, the current playback time may be determined to be close to the playback time of the buffered segment when the current playback time is within a threshold time of the playback time of the buffered segment.

If the current playback time is determined to be close to the playback time of the buffered segment (YES at 8030), the method 8000 may proceed to 8040. If the current playback time is not determined to be close to the playback time of the buffered segment (NO at 8030), the method 8000 may proceed to 8100.

At 8040, the method 8000 includes determining whether a current duration of the playback buffer is larger than a threshold duration.

If the current duration of the playback buffer is determined to be larger than a threshold duration (YES at 8040), the method 8000 may proceed to 8050. If the current duration of the playback buffer is not determined to be larger than a threshold duration (NO at 8040), the method 8000 may proceed to 8100.

At 8050, the method 8000 includes determining whether a current bandwidth is larger than a threshold bandwidth.

If the current bandwidth is determined to be larger than the threshold bandwidth (YES at 8050), the method 8000 may proceed to 8060. If the current bandwidth is not determined to be larger than the threshold bandwidth (NO at 8050), the method 8000 may proceed to 8100.

At 8060, the method 8000 includes determining whether a current viewport is different from the previous viewport.

If the current viewport is determined to be different from the previous viewport (YES at 8060), the method 8000 may proceed to 8070. If the current viewport is not determined to be different from the previous viewport (NO at 8060), the method 8000 may proceed to 8100.

In embodiments, the elements 8030, 8040, 8050, and 8060 may be performed by, for example, SDRM 502.

In embodiments, the elements 8030, 8040, 8050, and 8060 may be rearranged within method 8000 and performed in any order.

Regardless of the order in which they are performed, based on determining that the current playback time is within the threshold time, that the current duration of the playback buffer is larger the threshold duration, and that the current bandwidth is larger than the threshold bandwidth, and that the current viewport is different from the previous viewport, at 8070 the method 8000 includes storing at least one refined tile corresponding to the current viewport in the playback buffer.

At 8080, the method 800 includes constructing a frame corresponding to the buffered segment based on the plurality of buffered tiles and the at least one refined tile corresponding to the current viewport. In embodiments, the frame may be constructed by TMM 602.

At 8090, the method 8000 includes decoding the coded VR video stream based on the constructed frame.

Based on determining that at least one of the current playback time is outside of the threshold time, that the current duration of the playback buffer is smaller the threshold duration, and that the current bandwidth is smaller than the threshold bandwidth, and that the current viewport is not different from the previous viewport, at 8100 the method

8000 includes storing a next segment of the coded VR video stream in the playback buffer. In embodiments, this may mean that SDRM 502 may determine a latest segment stored in the playback buffer, and may download a segment that sequentially follows the latest segment and store this segment in the playback buffer.

In embodiments, based on determining that at least one of the current playback time is outside of the threshold time, that the current duration of the playback buffer is smaller the threshold duration, and that the current bandwidth is smaller than the threshold bandwidth, and that the current viewport is not different from the previous viewport, the method 8000 may include constructing the frame corresponding to the buffered segment based on the plurality of buffered tiles.

In embodiments, the at least one refined tile corresponding to the current viewport may have at least one of a higher video quality or a higher resolution than at least one buffered tile of the plurality of buffered tiles.

In embodiments, the current viewport may correspond to a field of view (FOV) of a user at the current playback time, and the previous viewport may correspond to the FOV of the user at a previous time when the buffered segment was stored in the playback buffer.

In embodiments, the frame may be constructed by merging the plurality of buffered tiles with the at least one refined tile corresponding to the current viewport. In embodiments, this merging may be performed by TMM 602.

In embodiments, the plurality of buffered tiles and the at least one refined tile corresponding to the current viewport may be obtained from the playback buffer in non-FIFO manner.

In embodiments, the frame may be constructed based on a frame read request corresponding to the buffered segment. In embodiments, this frame read request may be received by TMM 602.

Embodiments may greatly improve 360 degree VR video streaming playback experience under different bandwidth conditions.

Embodiments may minimize the possibility of playback stalls during viewport-optimized 360 VR video streaming by allowing a client to have larger playback buffers without affecting viewport switching latency. Playback stalls can be detrimental to user experience especially when VR video is consumed within a head-mounted (HMD) device as the users are forced to wait in the virtual environment.

In embodiments, SDRM 502 may make better use of client's bandwidth over time and by doing so, delivers more uniform quality streaming instead of frequently changing the quality of the video as the bandwidth varies. Uniform quality playback may be a key metric for measuring playback QoE, and embodiments may achieve it by prebuffering tiles during the periods of high bandwidths.

SDRM 502 may also help in refining viewport quality by allowing a client to download high fidelity tiles closer to the actual playback of the segments. This allows SDRM 502 to prebuffer some tiles in advance and also download some tiles closer to the playback time.

Viewport-optimized streaming may deliver highest quality video in the user's field of view. By performing the late merging of the tiles in the TMM 602 just before they are delivered to the decoder queue, embodiments may enable users to consume the most optimized viewport for their FOV.

Overall, embodiments may substantially improve quality of playback experience. Embodiments may ensure that users have highest quality and stall free playback experience under different network conditions. Moreover, embodiments may be equally applicable to all types of viewport optimized streaming solutions, for example stream based solutions or tile based solutions.

It may be appreciated that FIG. 8 provides only an illustration of one implementation and does not imply any limitations with regard to how different embodiments may be implemented. Many modifications to the depicted environments may be made based on design and implementation requirements.

Figure 9:
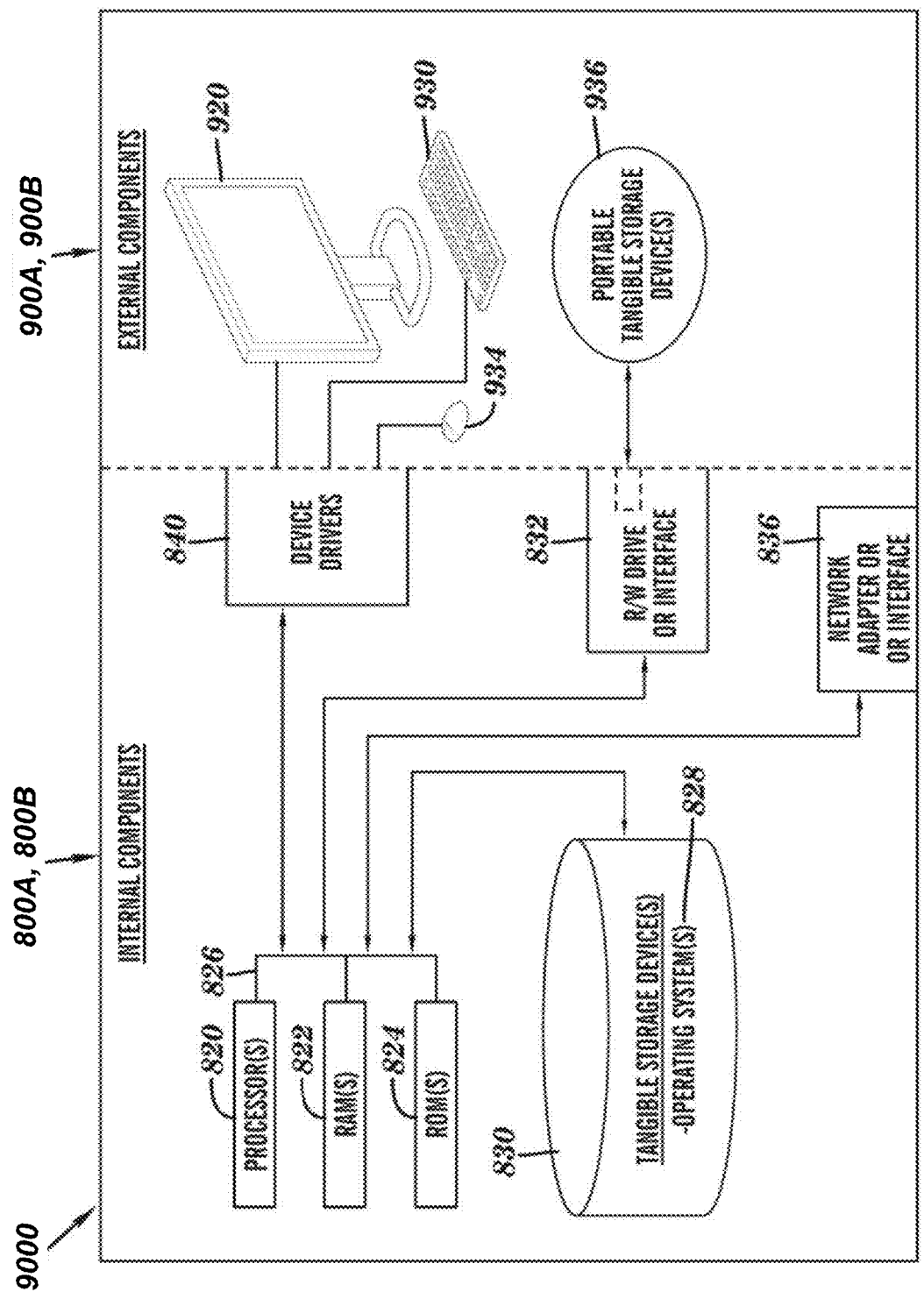
FIG. 9 is a block diagram of internal and external components of computers and servers depicted in FIG. 1 according to at least one embodiment.

FIG. 9 is a block diagram 9000 of internal and external components of computers depicted in FIG. 1 in accordance with an illustrative embodiment. It should be appreciated that FIG. 9 provides only an illustration of one implementation and does not imply any limitations with regard to the environments in which different embodiments may be implemented. Many modifications to the depicted environments may be made based on design and implementation requirements.

Computer 102 (FIG. 1) and server computer 114 (FIG. 1) may include respective sets of internal components 800A,B and external components 900A,B illustrated in FIG. 4. Each of the sets of internal components 800 include one or more processors 820, one or more computer-readable RAMs 822 and one or more computer-readable ROMs 824 on one or more buses 826, one or more operating systems 828, and one or more computer-readable tangible storage devices 830.

Processor 820 is implemented in hardware, firmware, or a combination of hardware and software. Processor 820 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 includes one or more processors capable of being programmed to perform a function. Bus 826 includes a component that permits communication among the internal components 800A,B.

The one or more operating systems 828, the software program 108 (FIG. 1) and the Video Encoding Program 116 (FIG. 1) on server computer 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 9, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory, an optical disk, a magneto-optic disk, a solid state disk, a compact disc (CD), a digital versatile disc (DVD), a floppy disk, a cartridge, a magnetic tape, and/or another type of non-transitory computer-readable tangible storage device that can store a computer program and digital information.

Each set of internal components 800A,B also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the software program 108 (FIG. 1) and the Video Encoding Program 116 (FIG. 1) can be stored on one or more of the respective portable computer-readable tangible storage devices 936, read via the respective R/W drive or interface 832 and loaded into the respective hard drive 830.

Each set of internal components 800A,B also includes network adapters or interfaces 836 such as a TCP/IP adapter cards; wireless Wi-Fi interface cards; or 3G, 4G, or 5G wireless interface cards or other wired or wireless communication links. The software program 108 (FIG. 1) and the Video Encoding Program 116 (FIG. 1) on the server computer 114 (FIG. 1) can be downloaded to the computer 102 (FIG. 1) and server computer 114 from an external computer via a network (for example, the Internet, a local area network or other, wide area network) and respective network adapters or interfaces 836. From the network adapters or interfaces 836, the software program 108 and the Video Encoding Program 116 on the server computer 114 are loaded into the respective hard drive 830. The network may comprise copper wires, optical fibers, wireless transmission, routers, firewalls, switches, gateway computers and/or edge servers.

Each of the sets of external components 900A,B can include a computer display monitor 920, a keyboard 930, and a computer mouse 934. External components 900A,B can also include touch screens, virtual keyboards, touch pads, pointing devices, and other human interface devices. Each of the sets of internal components 800A,B also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, some embodiments are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 10:
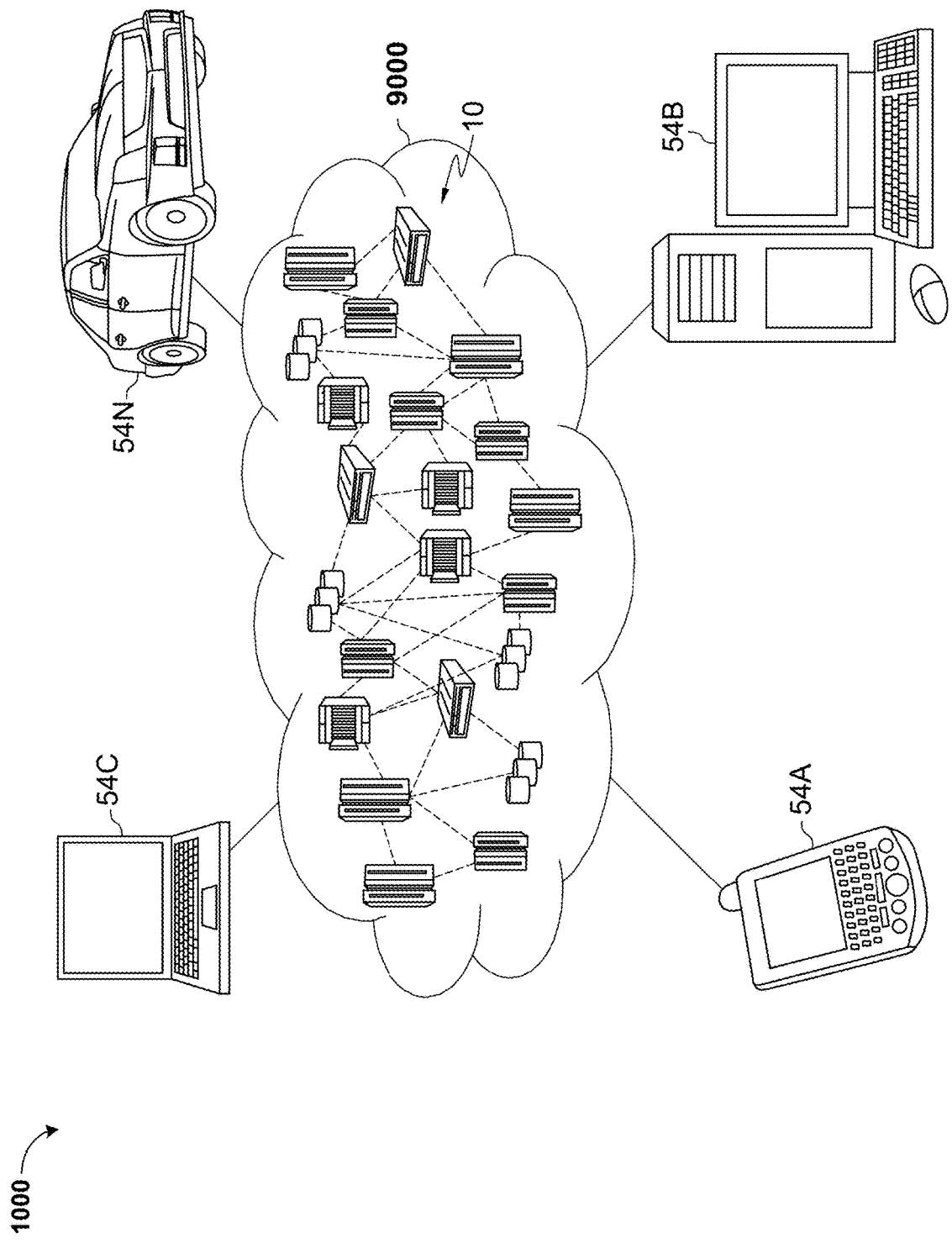
FIG. 10 is a block diagram of an illustrative cloud computing environment including the computer system depicted in FIG. 1, according to at least one embodiment.

Referring to FIG. 10, an illustrative cloud computing environment 1000 is depicted which may be suitable for implementing certain embodiments of the disclosed subject matter. As shown, cloud computing environment 1000 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 54A-N shown in FIG. 10 are intended to be illustrative only and that cloud computing nodes 10 and cloud computing environment 1000 can communicate with any type of computerized device over any type of network and/or network addressable connection (e.g., using a web browser).

Figure 11:
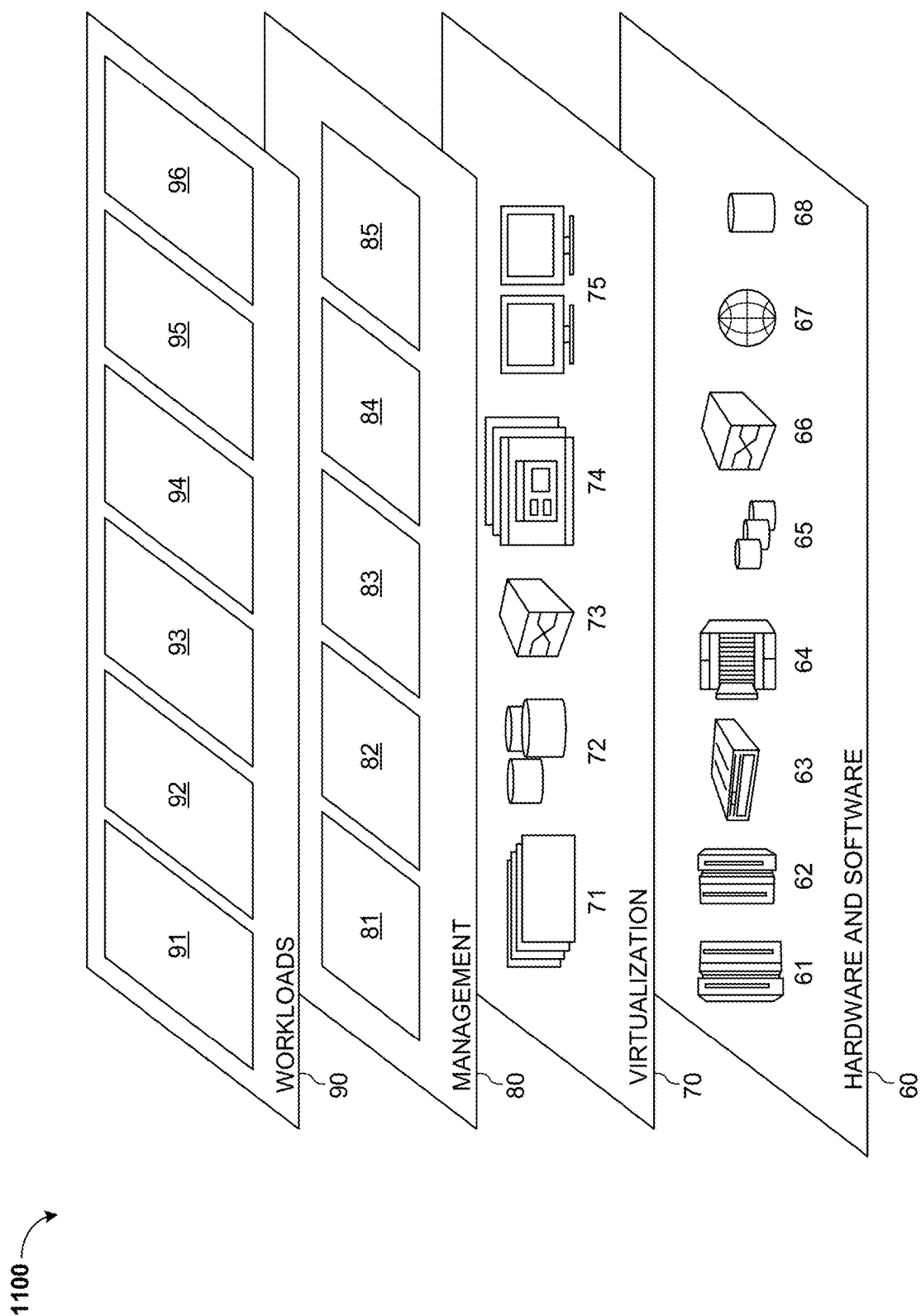
FIG. 11 is a block diagram of functional layers of the illustrative cloud computing environment of FIG. 10, according to at least one embodiment.

Referring to FIG. 11, a set of functional abstraction layers 1100 provided by cloud computing environment 1000 (FIG. 10) is shown. It should be understood in advance that the components, layers, and functions shown in FIG. 11 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Video Encoding/Decoding 96. Video Encoding/Decoding 96 may encode/decode video data using delta angles derived from nominal angles.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Further, any components, elements, modules or units described herein may be embodied as various numbers of hardware, software and/or firmware structures that execute respective functions described above, according to embodiments. For example, these components, elements, modules or units may use a direct circuit structure, such as a memory, processing, logic, a look-up table, etc. that may execute the respective functions through controls of one or more microprocessors or other control apparatuses. Also, these components, elements, modules or units may be specifically embodied by a program or a part of code, which contains one or more executable instructions for performing specified logic functions. Also, at least one of these components, elements, modules or units may further include a processor such as a central processing unit (CPU) that performs the respective functions, a microprocessor, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

Selected Acronyms:
VR: Virtual Reality
HMD: Head Mounted Device
QoE: Quality of Experience
FOV: Field of View
ABR: Adaptive Bitrate
IDR: Instantaneous Decoder Refresh
SDRM: Segment Download and Refinement Module
TMM: Tile Merger Module
FIFO: First In First Out

What is claimed is:

1. A method of receiving a coded virtual reality (VR) video stream using at least one processor, the method comprising:
receiving a plurality of segments of the coded VR video stream;
storing the plurality of segments in a playback buffer, wherein a buffered segment from among the plurality of segments comprises a plurality of buffered tiles including at least one refined buffered tile corresponding to a previous viewport;

determining whether a current playback time of a VR video corresponding to the coded VR video stream is within a threshold time of a playback time of the buffered segment;

determining whether a current duration of the playback buffer is larger than a threshold duration;

determining whether a current bandwidth is larger than a threshold bandwidth;

determining whether a current viewport is different from the previous viewport;

based on determining that the current playback time is within the threshold time, that the current duration of the playback buffer is larger than the threshold duration, and that the current bandwidth is larger than the threshold bandwidth, and that the current viewport is different from the previous viewport, storing at least one refined tile corresponding to the current viewport in the playback buffer;

constructing a frame corresponding to the buffered segment based on the plurality of buffered tiles and the at least one refined tile corresponding to the current viewport; and decoding the coded VR video stream based on the constructed frame.

2. The method of claim 1, wherein the at least one refined tile corresponding to the current viewport has at least one of a higher video quality or a higher resolution than at least one buffered tile of the plurality of buffered tiles.

3. The method of claim 1, further comprising:
based on determining that at least one of the current playback time is outside of the threshold time, that the current duration of the playback buffer is smaller the threshold duration, and that the current bandwidth is smaller than the threshold bandwidth, and that the current viewport is not different from the previous viewport, storing a next segment of the coded VR video stream in the playback buffer.

4. The method of claim 1, further comprising:
based on determining that at least one of the current playback time is outside of the threshold time, that the current duration of the playback buffer is smaller the threshold duration, and that the current bandwidth is smaller than the threshold bandwidth, and that the current viewport is not different from the previous viewport, constructing the frame corresponding to the buffered segment based on the plurality of buffered tiles.

5. The method of claim 1, wherein the current viewport corresponds to a field of view (FOV) of a user at the current playback time, and
wherein the previous viewport corresponds to the FOV of the user at a previous time when the buffered segment was stored in the playback buffer.

6. The method of claim 1, wherein the frame is constructed by merging the plurality of buffered tiles with the at least one refined tile corresponding to the current viewport.

7. The method of claim 1, wherein the plurality of buffered tiles and the at least one refined tile corresponding to the current viewport are not obtained from the playback buffer in a first in first out (FIFO) manner.

8. The method of claim 1, wherein the frame is constructed based on a frame read request corresponding to the buffered segment.

9. A device for receiving a coded virtual reality (VR) video stream, the device comprising:
at least one memory configured to store program code; and
at least one processor configured to read the program code and operate as instructed by the program code, the program code including:
receiving code configured to cause the at least one processor to receive a plurality of segments of the coded VR video stream;
first storing code configured to cause the at least one processor to store the plurality of segments in a playback buffer, wherein a buffered segment from among the plurality of segments comprises a plurality of buffered tiles including at least one refined buffered tile corresponding to a previous viewport;
first determining code configured to cause the at least one processor to determine whether a current playback time of a VR video corresponding to the coded VR video stream is within a threshold time of a playback time of the buffered segment;
second determining code configured to cause the at least one processor to determine whether a current duration of the playback buffer is larger than a threshold duration;
third determining code configured to cause the at least one processor to determine whether a current bandwidth is larger than a threshold bandwidth;
fourth determining code configured to cause the at least one processor to determine whether a current viewport is different from the previous viewport;
second storing code configured to cause the at least one processor to, based on determining that the current playback time is within the threshold time, that the current duration of the playback buffer is larger than the threshold duration, and that the current bandwidth is larger than the threshold bandwidth, and that the current viewport is different from the previous viewport, store at least one refined tile corresponding to the current viewport in the playback buffer;
first constructing code configured to cause the at least one processor to construct a frame corresponding to the buffered segment based on the plurality of buffered tiles and the at least one refined tile corresponding to the current viewport; and
decoding code configured to cause the at least one processor to decode the coded VR video stream based on the constructed frame.

10. The device of claim 9, wherein the at least one refined tile corresponding to the current viewport has at least one of a higher video quality or a higher resolution than at least one buffered tile of the plurality of buffered tiles.

11. The device of claim 9, wherein the program code further comprises third storing code configured to cause the at least one processor to, based on determining that at least one of the current playback time is outside of the threshold time, that the current duration of the playback buffer is smaller the threshold duration, and that the current bandwidth is smaller than the threshold bandwidth, and that the current viewport is not different from the previous viewport, store a next segment of the coded VR video stream in the playback buffer.

12. The device of claim 9, wherein the program code further comprises second constructing code configured to cause the at least one processor to, based on determining that at least one of the current playback time is outside of the threshold time, that the current duration of the playback buffer is smaller the threshold duration, and that the current bandwidth is smaller than the threshold bandwidth, and that the current viewport is not different from the previous viewport, construct the frame corresponding to the buffered segment based on the plurality of buffered tiles.

13. The device of claim 9, wherein the current viewport corresponds to a field of view (FOV) of a user at the current playback time, and
wherein the previous viewport corresponds to the FOV of the user at a previous time when the buffered segment was stored in the playback buffer.

14. The device of claim 9, wherein the frame is constructed by merging the plurality of buffered tiles with the at least one refined tile corresponding to the current viewport.

15. The device of claim 9, wherein the plurality of buffered tiles and the at least one refined tile corresponding to the current viewport are not obtained from the playback buffer in a first in first out (FIFO) manner.

16. The device of claim 9, wherein the frame is constructed based on a frame read request corresponding to the buffered segment.

17. A non-transitory computer-readable medium storing instructions, the instructions comprising: one or more instructions that, when executed by one or more processors of a device for receiving a coded virtual reality (VR) video stream, cause the one or more processors to:
receive a plurality of segments of the coded VR video stream;
store the plurality of segments in a playback buffer, wherein a buffered segment from among the plurality of segments comprises a plurality of buffered tiles including at least one refined buffered tile corresponding to a previous viewport;
determine whether a current playback time of a VR video corresponding to the coded VR video stream is within a threshold time of a playback time of the buffered segment;
determine whether a current duration of the playback buffer is larger than a threshold duration;
determine whether a current bandwidth is larger than a threshold bandwidth;
determine whether a current viewport is different from the previous viewport;
based on determining that the current playback time is within the threshold time, that the current duration of the playback buffer is larger than the threshold duration, and that the current bandwidth is larger than the threshold bandwidth, and that the current viewport is different from the previous viewport, store at least one refined tile corresponding to the current viewport in the playback buffer;
construct a frame corresponding to the buffered segment based on the plurality of buffered tiles and the at least one refined tile corresponding to the current viewport; and
decode the coded VR video stream based on the constructed frame.

18. The non-transitory computer-readable medium of claim 17, wherein the at least one refined tile corresponding to the current viewport has at least one of a higher video quality or a higher resolution than at least one buffered tile of the plurality of buffered tiles.

19. The non-transitory computer-readable medium of claim 17, wherein the one or more instructions further cause the one or more processors to, based on determining that at least one of the current playback time is outside of the threshold time, that the current duration of the playback buffer is smaller the threshold duration, and that the current bandwidth is smaller than the threshold bandwidth, and that the current viewport is not different from the previous viewport, store a next segment of the coded VR video stream in the playback buffer.

20. The non-transitory computer-readable medium of claim 17, wherein the one or more instructions further cause the one or more processors to, based on determining that at least one of the current playback time is outside of the threshold time, that the current duration of the playback buffer is smaller the threshold duration, and that the current bandwidth is smaller than the threshold bandwidth, and that the current viewport is not different from the previous viewport, construct the frame corresponding to the buffered segment based on the plurality of buffered tiles.

* * * * *